United States Patent
O'Connor et al.

(10) Patent No.: US 9,003,130 B2
(45) Date of Patent: Apr. 7, 2015

(54) MULTI-CORE PROCESSING DEVICE WITH INVALIDATION CACHE TAGS AND METHODS

(71) Applicant: Advanced Micro Devices, Inc., Sunnyvale, CA (US)

(72) Inventors: James O'Connor, Austin, TX (US); Bradford M. Beckmann, Redmond, WA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 167 days.

(21) Appl. No.: 13/719,730

(22) Filed: Dec. 19, 2012

(65) Prior Publication Data

US 2014/0173210 A1    Jun. 19, 2014

(51) Int. Cl.
G06F 13/00 (2006.01)
G06F 12/08 (2006.01)

(52) U.S. Cl.
CPC ........ *G06F 12/0864* (2013.01); *G06F 12/0815* (2013.01)

(58) Field of Classification Search
CPC ............ G06F 12/0808; G06F 12/0815; G06F 12/0846; G06F 12/0853; G06F 12/0891
See application file for complete search history.

(56) References Cited

U.S. PATENT DOCUMENTS

| | | | | |
|---|---|---|---|---|
| 7,900,020 | B2 * | 3/2011 | Williamson et al. | 711/216 |
| 2002/0083271 | A1 * | 6/2002 | Mounes-Toussi | 711/144 |
| 2007/0186054 | A1 * | 8/2007 | Kruckemyer et al. | 711/144 |
| 2010/0180085 | A1 * | 7/2010 | Dave et al. | 711/146 |
| 2011/0153948 | A1 * | 6/2011 | Vash et al. | 711/130 |

OTHER PUBLICATIONS

Luiz Andre Barroso, Kourosh Gharachorloo, Robert McNamara, Andreas Nowatzyk, Shaz Qadeer, Barton Sano, Scott Smith, Robert Stets and Ben Verghese. Piranha: a scalable architecture based on single-chip multiprocessing. In Proceedings of the 27th Annual International Symposium on Computer Architecture (ISCA'00). ACM, New York, NY, USA, pp. 282-293 (2000).

\* cited by examiner

*Primary Examiner* — Aimee Li
*Assistant Examiner* — Jason Blust
(74) *Attorney, Agent, or Firm* — Volpe and Koenig, P.C.

(57) ABSTRACT

A data processing device is provided that facilitates cache coherence policies. In one embodiment, a data processing device utilizes invalidation tags in connection with a cache that is associated with a processing engine. In some embodiments, the cache is configured to store a plurality of cache entries where each cache entry includes a cache line configured to store data and a corresponding cache tag configured to store address information associated with data stored in the cache line. Such address information includes invalidation flags with respect to addresses stored in the cache tags. Each cache tag is associated with an invalidation tag configured to store information related to invalidation commands of addresses stored in the cache tag. In such embodiment, the cache is configured to set invalidation flags of cache tags based upon information stored in respective invalidation tags.

23 Claims, 2 Drawing Sheets

| EXACT BIT: 1 | ADDRESS / HASH ARRAY: 42 | PROB. OF SPURIOUS |
|---|---|---|
| 51 → 1 | ADDRESS: 42 | 0 |
| 52 → 0 | HASH ARRAY: 42 | 1 IN 21 (W/2 ENTRIES) |
| 53 → 0 | HASH ARRAY: 42 | 1 IN 14 (W/3 ENTRIES) |
| 54 → 0 | HASH ARRAY: 42 | ~1 IN 10 (W/4 ENTRIES) |

40, 42

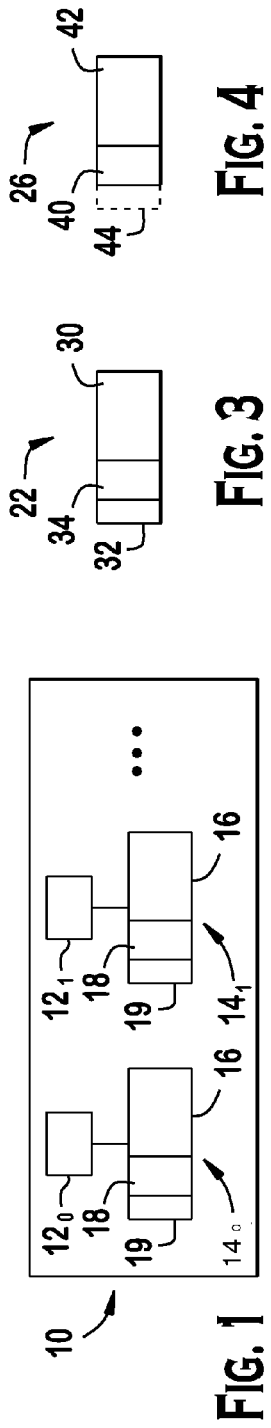

| | ADDRESS / HASH ARRAY : 42 | PROB. OF SPURIOUS |
|---|---|---|
| EXACT BIT : 1 | | |
| 1 | ADDRESS : 42 | 0 |
| 0 | HASH ARRAY : 42 | 1 IN 21 (W / 2 ENTRIES) |
| 0 | HASH ARRAY : 42 | 1 IN 14 (W / 3 ENTRIES) |
| 0 | HASH ARRAY : 42 | ~1 IN 10 (W / 4 ENTRIES) |

FIG. 5

| | ADDRESS / HASH ARRAY : 41 | | PROB. OF SPURIOUS |
|---|---|---|---|
| EXACT COUNT : 2 | | | |
| 01 | ADDRESS : 41 | | 1 IN 2 TRILLION |
| 10 | ADDRESS : 21 | ADDRESS : 20 | ~1 IN 699000 |
| 11 | ADDRESS : 14 | ADDRESS : 13 | 1 IN 4096 |
| 00 | HASH ARRAY : 41 | | ~1 IN 10 (W / 4 ENTRIES) |

FIG. 6

MULTI-CORE PROCESSING DEVICE WITH INVALIDATION CACHE TAGS AND METHODS

FIELD

The present disclosure is generally directed to data processing devices that include multiple processing engines or cores having associated caches and, in particular, to facilitating cache coherence policies.

BACKGROUND

Data processing devices that include multiple processing engines, or cores, are known in the art. Typically, each respective core will have an associated working memory or cache. The availability of such working memory enables a processing engine of the processing device to temporarily access and store data for calculations and other work in progress in an efficient manner. Generally, this avoids having to await retrieval of data during the particular processing operation from a main memory or other source and also avoids having to store intermediate results of a particular processing operation to main memory.

Typically, a cache is configured to store a plurality of cache entries where each cache entry includes a cache line for data and a corresponding cache tag for address information associated with data stored in the cache line. Conventionally, the cache tag address information includes an invalidation flag with respect to each address stored in the cache tag. Where caches of different processors share information, invalidation flags can be used to assist in facilitating cache coherence policies, i.e. assuring that information shared by caches is the same or "valid" in each cache.

When data is accessed in a cache by its respective processing engine, it may be modified during a processing operation such that it may no longer reflect the contents of the main memory or other source where it had been retrieved. Conventionally, this results in the cache containing both "clean" and "dirty" data entries where a clean data entry accurately reflects the contents of main memory or other source as originally retrieved and where a dirty data entry may not. Caches may be configured to implement a "write through" policy such that anytime data is written back to the cache it is immediately written back to main memory which eliminates the dirty data issue. However, in various contexts, implementation of such "write through" policies may negatively effect performance or have other undesirable consequences.

With respect to cache coherency policies, there are various situations where there is an update to the value of a memory location causing a stored cache value to become invalid. Such situations and others can result in the generation of invalidation commands from various components of a data processing system.

For example, if a particular data entry in a cache is modified to contain dirty data, not only does it no longer match the data saved at the respective address in main memory, it also does not match the data for the respective address saved in other caches. Accordingly, in connection with writing dirty data to a cache, invalidation commands will be sent to other caches that are to be maintained as coherent to set to "invalid" the invalidation flag with respect to that same data address if it is stored in the other caches.

In any event, when a cache receives an invalidation command, it will normally process it to flag the corresponding data as invalid if data for the respective address if currently stored in the cache. At the same time, the cache may be receiving multiple other commands so that the order of processing commands requires arbitration and can produce processing delays, i.e. latency, in the processing of commands that can affect overall processing performance.

Caches coherence policies may generally be employed with any type or combination of types of data processing components, including, but not limited to, central processing units (CPUs), graphics processing units (GPUs), and accelerated processing units (APUs).

SUMMARY OF EXEMPLARY EMBODIMENTS

A data processing device is provided that facilitates cache coherence policies. In one embodiment, a data processing device utilizes invalidation tags in connection with a cache that is associated with a processing engine. The cache is configured to store a plurality of cache entries where each cache entry includes a cache line configured to store data and a corresponding cache tag configured to store address information associated with data stored in the cache line. Such address information includes an invalidation flag with respect to each address stored in the cache tag. Each cache tag is associated with an invalidation tag configured to store information related to invalidation commands of addresses stored in the cache tag. In such embodiment, the cache is configured to set invalidation flags of cache tags based upon information stored in respective invalidation tags.

Each cache entry may include the invalidation tag associated with the entry's cache tag. In other embodiments, however, invalidation tags may be associated with the cache tags of a plurality of cache entries of one or more caches. In one embodiment, the invalidation tags are configured to receive invalidation commands from at least one other processing engine and/or other sources.

In one embodiment, the invalidation tags include a clear state indicating the absence of received invalidation commands and the cache is configured to determine whether to set invalidation flags to an invalid state with respect to addresses stored in a cache tag upon a condition that the associated invalidation tag is not in the clear state. The cache can be further configured to determine whether to set invalidation flags to an invalid state with respect to addresses stored in a cache tag upon a further condition that a look up command with respect to the cache tag is received. A cache associated with invalidation tags is configured to set an invalidation tag to the clear state following a cache determination whether to set invalidation flags to an invalid state with respect to addresses stored in the cache tag associated with the invalidation tag.

The invalidation tags may include a field for storing information related to a number of invalidation commands received and a field for storing invalidation address information corresponding to received commands. In such case, the address information may be stored the form of a hash array on specified conditions. The invalidation tags may also include other fields such as a field for storing information related to exclusivity or other cache coherence states of the addresses stored in the cache tags with which the invalidation tags are associated.

In a further embodiment, a data processing device includes a plurality of processing engines, each associated with a respective cache. Each cache is configured to store a plurality of cache entries that include a cache line configured to store data and a cache tag configured to store address information associated with data stored in the cache line where the address information includes an invalidation flag with respect to each stored address. In such case, each cache tag can be associated with an invalidation tag configured to store information related to invalidation commands of addresses stored in the cache tag and each cache can be configured to set invalidation flags of cache tags based upon information stored in respective invalidation tags.

A non-transitory computer-readable storage medium storing a set of instructions for execution by a general purpose computer to facilitate manufacture of an integrated circuit that includes a plurality of processing components each having a processing engine associated with a respective cache. Each cache configured to store a plurality of cache entries. Each cache entry including a cache line configured to store data and a cache tag configured to store address information associated with data stored in the cache line portion where the address information includes an invalidation flag with respect to each stored address. Each cache tag associated with an invalidation tag configured to store information related to invalidation commands of addresses stored in the cache tag. Each cache configured to set invalidation flags of cache tags based upon information stored in respective invalidation tags.

A non-transitory computer-readable storage medium storing a set of instructions for execution by a general purpose computer to facilitate manufacture of an integrated circuit that includes a processing component having a cache associated with a processing engine. The cache configured to store a plurality of cache entries. Each cache entry including a cache line configured to store data and a corresponding cache tag configured to store address information associated with data stored in the cache line where the address information includes an invalidation flag with respect to each address stored in the cache tag. Each cache tag associated with an invalidation tag configured to store information related to invalidation commands of addresses stored in the cache tag. The cache configured to set invalidation flags of cache tags based upon information stored in respective invalidation tags.

Such non-transitory computer-readable storage mediums contains instructions that are hardware description language (HDL) instructions used for the manufacture of a device.

BRIEF DESCRIPTION OF THE DRAWINGS

A more detailed understanding may be had from the following description, given by way of example in conjunction with the accompanying drawings.

FIG. 1 is a block diagram of a processing device in which one or more disclosed embodiments may be implemented.

FIG. 2 is a block diagram of an example of a cache structure for a cache associated with a processing engine of FIG. 1.

FIG. 3 is a block diagram of an example of a cache tag structure for the cache structure of FIG. 2.

FIG. 4 is a block diagram of an example of an invalidation tag structure for the cache structure of FIG. 2.

FIG. 5 is an illustration reflecting a specific configuration of the example of an invalidation tag structure of FIG. 4.

FIG. 6 is an illustration reflecting another specific configuration of the example of an invalidation tag structure of FIG. 4.

DETAILED DESCRIPTION

Referring to FIG. 1, an example data processing device 10 is illustrated having a plurality of processing engines or cores $12_0$, $12_1$, . . . , that are each associated with a respective working memory or cache $14_0$, $14_1$, . . . . The processing engines or cores $12_0$, $12_1$, . . . , may be of any type or combination of types, including, but not limited to, central processing units (CPUs), graphics processing units (GPUs), and accelerated processing units (APUs). Each respective working memory or cache $14_0$, $14_1$, . . . , may be integrated with its respective processing engines or cores $12_0$, $12_1$, . . . , into a processing unit component on an integrated circuit. In some embodiments, the example data processing device 10 is configured such that the caches $14_0$, $14_1$ of processing engines $12_0$, $12_1$ share information in accordance with a desired cache coherence policy.

The example of FIG. 1, illustrates each cache $14_0$, $14_1$, . . . , as having a cache data array portion 16, a tag array portion 18 and an invalidation array portion 19. In some embodiments, each cache $14_0$, $14_1$, . . . , is configured store a plurality of cache entries where each cache entry includes a cache line for data within the cache data array portion 16 and a corresponding cache tag for address information associated with data stored in the cache line within the tag array portion 18.

Referring to FIG. 2, an example of a cache structure 14 is illustrated that may be used for one or all of the caches $14_0$, $14_1$, . . . , illustrated in FIG. 1. The example of FIG. 2 illustrates a structure for a cache tag array 18 in which each cache entry is provided with a cache tag set $20_0$, $20_1$, $20_2$, . . . , $20_n$, comprised of four (4) individual cache tags 22. Each cache tag set $20_0$, $20_1$, $20_2$, . . . , $20_n$, is associated with a respective cache line $24_0$, $24_1$, $24_2$, . . . , $24_n$, within the cache data array 16. Accordingly, in this example, each cache line $24_0$, $24_1$, $24_2$, . . . , $24_n$, of a cache entry can hold data for up to four (4) different data addresses where each corresponding address is stored in one of the cache tags 22 of the respective cache tag set $20_0$, $20_1$, $20_2$, . . . , $20_n$, for that cache entry.

FIG. 3 illustrates an example structure for a cache tag 22 that includes an address portion 30, an invalidation flag 32, and a dirty data flag 34. This example is non-limiting; fewer or more flags and/or data field for the cache tag 22 may be used. In this example, the address portion 30 is used for storing an address of data stored in the corresponding cache line.

The invalidation flag 32 when not set indicates that the corresponding data may be used by the processing engine associated with the cache in which the cache tag resides. The invalidation flag 32 when set indicates that the corresponding data should not be used by the processing engine associated with the cache in which the cache tag resides. In such case the processing engine will need to find a "valid" copy of the data which may be supplied, for example, by a main memory or another cache.

The dirty data flag 34 when not set indicates that the corresponding data is "clean," i.e. data that accurately reflects the contents of main memory or other source as originally retrieved. The dirty data flag 34 when set indicates that the corresponding data is "dirty," i.e. data that has been modified during a processing operation such that it may no longer reflect the contents of the main memory or other source where it had been retrieved.

With respect to cache tag arrays of conventional caches, invalidation commands are typically directly received by the cache tag array mediated with other commands received and executed in turn to determine whether the invalidation field of a cache tag with the array should be set. This requires cache tag ram access bandwidth and power to handle the invalidation requests and can add extra latency to the invalidation response or processor requests while the invalidation requests arbitrates for the tag ram.

Unlike conventional caches, an auxiliary structure is provided in the form of an invalidation array associated with one or more caches. In some embodiments, the invalidation array is configured with a port to receive invalidation commands intended for the cache or caches with which it is associated.

Among the potential benefits provided, employing such an auxiliary structure can provide reduced bandwidth, power, and/or porting requirements for cache tag rams, particularly for write-through caches in coherent multicore systems and particularly for highly set associative caches of read-only data, e.g. instruction caches, in systems supporting self-modifying code, e.g. x86 cores.

FIG. 2 illustrates an example of such an invalidation array 19 that is incorporated into the structure of example cache 14 where an invalidation tag $26_0, 26_1, 26_2, \ldots, 26_n$, is provided with respect to each cache tag set $20_0, 20_1, 20_2, \ldots, 20_n$, of the cache tag array 18. Although this example illustrates a one to one correspondence between the cache tag set/cache line entries, this is not required. An invalidation tag may be associated with cache tag sets of multiple cache entries which may or may not belong to the same cache. In a non-limiting example, for a multi-level cache structure having level one and level two caches, a particular invalidation tag can be associated with one or more cache entries in both a level one cache and a level two cache. Similarly, an invalidation array need not be directly incorporated into the cache structure of a single cache, but can be configured to service multiple caches.

In some embodiments, all caches in a multi-level hierarchy are configured to access a given updated invalidation tag before it is cleared. For example, for a two level cache, the invalidation tag array can include four (4) states instead of just "valid" and "clear", such as "VALID—no caches checked", "VALID—L1 checked", "VALID—L2 checked" and "CLEAR" states. Such state indications may be provided with two additional bits per invalidation tag entry. In such case, when an invalidation command is received by the invalidation array, the respective invalidation tag entry will be set to indicate the "VALID-no caches checked" state.

Where the invalidation tag is in the VALID-no caches checked state when an access to the L1 cache occurs, the state indication in the invalidation tag would be changed to indicate the "VALID-L1 checked" state. Where the invalidation tag is in the VALID-no caches checked state when an access to the L2 cache occurs, the state indication in the invalidation tag would be changed to indicate the "VALID-L2 checked" state.

Where the invalidation tag is in the VALID-L1 checked state when an access to the L1 cache occurs, the invalidation tag would remain in the "VALID-L1 checked" state. Where the invalidation tag is in the VALID-L2 checked state when an access to the L2 cache occurs, the state would remain in the "VALID-L2 checked" state.

Where the invalidation tag is in the VALID-L1 checked state when an access to the L2 cache occurs, the state indication in the invalidation tag would be changed to indicate the "CLEAR" state. Where the invalidation tag is in the VALID-L2 checked state when an access to the L1 cache occurs, the state indication in the invalidation tag would be changed to indicate the "CLEAR" state.

With respect to the FIG. 2 example, each cache tag set $20_0, 20_1, 20_2, \ldots, 20_n$, and, accordingly, each cache tag 22 within a respective set, is associated with an invalidation tag $26_0, 26_1, 26_2, \ldots, 26_n$, that is configured to store information related to invalidation commands of addresses stored in the cache tags 22 of the respective cache tag set $20_0, 20_1, 20_2, \ldots, 20_n$. The cache 14 is configured to set invalidation flags 32 of the cache tags 22 based upon information stored in respective invalidation tags $26_0, 26_1, 26_2, \ldots, 26_n$.

FIG. 4 illustrates an example structure for an invalidation tag 26 that includes a field 40 for storing information related to a number of invalidation commands received and a field 42 for storing invalidation address information corresponding to received commands. In this example, the field 42 is used to store all or part of an actual address and/or a hash array representing address information of one or more invalidation commands.

The FIG. 4 example is non-limiting. Fewer or more data field for the invalidation tag 26 may be used. In another non-limiting example, field 40 is eliminated and only field 42 is provided for a hash-array or other invalidation address information corresponding to received commands. In a further non-limiting example, it may be is desired to implement a full cache coherency protocol such as MOESI, where cache entries may exist in one of a Modified, Owned, Exclusive, Shared or Invalid states. In such case it may be desired for the invalidation tag 26 to include a further field 44 (shown in phantom) to indicate Exclusivity of addresses stored in the cache tags 22 with which the invalidation tag 24 is associated.

FIGS. 5 and 6, illustrate specific configurations for invalidation tag 26 where the invalidation tag 26 has forty-three (43) bits and it is designed to receive invalidation commands with respect to data addresses that are forty-two (42) bits in length. In each case, a clear state of all zeros (0s) is initiated to indicate the absence of processing commands received by the invalidation tag 26 that requires attention of the cache 14 to make a determination of whether to set a cache tag invalidation flag.

With respect to the FIG. 5 configuration, the field 40 for storing information related to a number of invalidation commands received is allocated one (1) bit and the field 42 for storing invalidation address information corresponding to received commands is allocated forty-two (42) bits. With such a configuration, the invalidation tag 26 starts in a clear state of all zeros and upon receiving a first invalidation command while in the clear state, sets the bit of field 40 to one (1) and stores the forty-two (42) bit address to be invalidated in field 42 as indicated at line 51. If the cache 14 proceeds to make a determination of whether to set a cache tag invalidation flag based on the invalidation tag 26 in this state, the probability of making a spurious determination is 0 since the data entire address is provided as also indicated at line 51.

When a second invalidation command is received before the invalidation tag 26 is reset to the clear state, the bit of field 40 is set to zero (0) and the forty-two (42) bit addresses to be invalidated per the new command and prior command are hashed and the result stored in field 42 as a forty-two (42) bit hash array as indicated at line 52. If the cache 14 proceeds to make a determination of whether to set a cache tag invalidation flag based on the invalidation tag 26 in this state, the probability of making a spurious determination is one in twenty-one since a hash array of the two addresses is provided as also indicated at line 52.

When a third invalidation command is received before the invalidation tag 26 is reset to the clear state, the bit of field 40 remains set to zero (0) and the forty-two (42) bit address to be invalidated per the new command is incorporated into the previously stored hash array with the result stored in field 42 as a modified forty-two (42) bit hash array as indicated at line 53. If the cache 14 proceeds to make a determination of whether to set a cache tag invalidation flag based on the invalidation tag 26 in this state, the probability of making a spurious determination is one in fourteen since a hash array of the three addresses is provided as also indicated at line 53.

When a fourth invalidation command is received before the invalidation tag 26 is reset to the clear state, the bit of field 40 remains set to zero (0) and the forty-two (42) bit address to be invalidated per the new command is incorporated into the previously stored hash array with the result stored in field 42 as a modified forty-two (42) bit hash array as indicated at line 54. If the cache 14 proceeds to make a determination of whether to set a cache tag invalidation flag based on the invalidation tag 26 in this state, the probability of making a spurious determination is about one in ten since a hash array of the four addresses is provided as also indicated at line 54.

Further invalidation commands may be received before the invalidation tag 26 is reset to the clear state in a similar manner, but the probability of spurious invalidations will continue to increase. In order to avoid to high of a probability of spurious invalidations, the cache 14 may be configured to proceed to make a determination of whether to set a cache tag invalidation flag based on an invalidation tag 26 whenever in the tag reaches a state of containing information of a predetermined number of commands.

An example of the operation of the invalidation array 19 of FIG. 2 based on using the FIG. 5 example configuration for invalidation tags $26_0, 26_1, 26_2, \ldots, 26_n$, can be performed as follows:

On receiving an invalidation indicating an address to be invalidated, i.e. an invalidation address, the invalidation address is used to select an invalidation tag $26_0, 26_1, 26_2, \ldots, 26_n$.

Then the process proceeds following one of the following four alternatives:
1. If the selected invalidation tag is in the all zero clear state, then the invalidation tag "exact bit" field 40 is set to one (1) and address field 42 is set to the corresponding bits of the invalidation address.
2. Otherwise, if the selected invalidation tag already has the "exact bit" field 40 set to one (1), the incoming invalidation address is compared with the address field of the Invalidation Tag, if they match, neither the "exact bit" field 40 or the address field 42 is changed.
3. Otherwise, if the selected invalidation tag already has the "exact bit" field 40 set to one (1), then the content of the address field 42 is hashed to select a bit within a hash-array bitfield and the incoming invalidation address is also hashed to select a bit within the hash array bitfield. Both of these bits are set to 1 while the remaining bits of the hash array bitfield are set to 0 in the field 42. (It is possible that both the original address field and the incoming invalidation address hash to the same bit, and only a single bit will be set). Also, the "exact bit" field 40 of the invalidation tag is set to zero (0).
4. Otherwise, the selected invalidation tag must have the "exact bit" field 40 set to 0 and a non-zero hash array field. The incoming invalidation address is hashed to select a bit in the hash array bitfield stored in field 42. The selected bit in the invalidation tag is set to 1 in field 42, and all other bits remain the same. Effectively, this type of non-exact hash array bitfield functions as a Bloom Filter.

Variations on this example will be readily apparent to those skilled in the art. For example, alternative step two (2) above can be eliminated in its entirety.

In general, the cache 14 may be configured to proceed to make a determination of whether to set cache tag invalidation flag based on an invalidation tag 26 on a variety of specified conditions. One condition, for example, may be based upon the receipt of a lookup command by the cache 14. An example of the operation of the cache 14 of FIG. 2 upon the receipt of a lookup command based on using the FIG. 5 example configuration for invalidation tags $26_0, 26_1, 26_2, \ldots, 26_n$, can be performed as follows:

On receiving a lookup command indicating an address to be looked up, i.e. a lookup address, the lookup address is used to select a cache tag set $20_0, 20_1, 20_2, \ldots, 20_n$ and the corresponding invalidation tag $26_0, 26_1, 26_2, \ldots, 26_n$.

Each cache tag 22 in the selected set is compared with the lookup address and, in parallel, is also compared with the corresponding invalidation tag. The comparisons with the corresponding invalidation tag is made based on one of the following three alternatives:
1. If the corresponding invalidation tag is in the all zero clear state, then there can be no match and it is unnecessary to determine whether to set any of the invalidation validation flags 32 of the cache tags 22 to invalid.
2. Otherwise, if the corresponding invalidation tag has the "exact bit" field 40 set to one (1), the address field 30 of the cache tag 22 is compared with the address field 42 of the corresponding invalidation tag. If they are the same, the result is a match.
3. Otherwise, the corresponding invalidation tag must have the "exact bit" field 40 set to zero (0) and a non-zero hash array stored in field 42. The content of the address field 30 of the cache tag 22 is hashed to select a bit in a hash array bit field. If the selected bit in the corresponding invalidation tag field 42 is set to one (1), the result is a match If a cache tag 22 is valid, i.e. does not have invalidation flag 32 set to invalid, matches the lookup address, and does not match the invalidation tag then the lookup results in a "hit", otherwise the lookup results in a "miss."

Any cache tag 22 in the selected cache tag set that matches the invalidation tag in the comparing step above has its have invalidation flag 32 set to invalid, and the corresponding invalidation tag is reset to the all zero clear state.

In one example embodiment, only the invalidation tag array 19, includes an invalidation command port. Providing one or more ports to the invalidation tag array 19 generally will require much less area than adding ports to the much larger set-associative cache tag array 18. In such case, invalidation requests only access the invalidation tag array that require less energy than access to the larger cache tag array.

In the above example, the implementation of invalidation commands is deferred until a lookup request accesses the cache tag array 18 that requires the contents of a cache tag set to be read from the array. The area of the invalidation tag array 19 and energy cost of reading the invalidation tag array 19 on each lookup is balanced against the savings in porting and/or invalidation energy performed in conventional caches.

In cases where multiple invalidations arrive for a cache set before the cache set is accessed, the imprecise nature of the effective Bloom Filtering may result in "false matches" to the invalidation tag array, causing spurious invalidations. In a cache containing only clean data (e.g. write-through or read-only), these spurious invalidations are not a correctness issue, but may reduce performance. However, it is expected these are rare.

The FIG. 5 example can be modified in a variety of ways. For example, the area and energy cost of the invalidation tag array 19 can be reduced at the expense of an increased probability of spurious invalidations. The address field/hash array field 42 can be smaller. In the case of an "exact" tag comparison, only the least significant cache tag address bits that fit are stored in and compared with an invalidation tag. In one alternative embodiment, the various bits of the cache tag can be XORed together to create a smaller set of bits that are stored in and compared with the invalidation tag.

In another example, the area and energy cost of the invalidation tag array can be increased to reduce the probability of spurious invalidations. The address field/hash array field 42 can be larger. More than one "exact" bit can be provided for field 40 in an invalidation tag 26. In such case, the "exact" bit becomes an "exact count" multi-bit field specifying the number of exact invalidation commands pending in the invalidation tag. If this field is all zeros, the hash array is larger, encompassing all the address fields. In this scheme a larger number of invalidates to a given set can be exactly captured without the chance for spurious invalidations.

In the further example illustrated in FIG. 6, the invalidation tag 26 also has forty-three (43) bits and is designed to receive invalidation commands with respect to data addresses that are forty-two (42) bits in length. As noted above, this example also uses a clear state of all zeros (0s).

With respect to the FIG. 6 configuration, the field 40 for storing information related to a number of invalidation commands received is allocated two (2) bits and the field 42 for storing invalidation address information corresponding to received commands is allocated forty-one (41) bits.

With such a configuration, the invalidation tag 26 starts in a clear state of all zeros. Upon receiving a first invalidation command while in the clear state, sets the bit of field 40 to binary one (01) and forty-one (41) least significant bits of the forty-two (42) bit address to be invalidated are stored in field 42 as indicated at line 61. If the cache 14 proceeds to make a determination of whether to set a cache tag invalidation flag based on the invalidation tag 26 in this state, the probability of making a spurious determination is about one (1) in two trillion as also indicated at line 51.

When a second invalidation command is received before the invalidation tag 26 is reset to the clear state, the bit of field 40 is set to binary two (10) and twenty-one (21) least significant bits and twenty (20) least significant bits, respectively of the forty-two (42) bits of the two invalidation addresses of the respective received commands are stored in field 42 as indicated at line 62. If the cache 14 proceeds to make a determination of whether to set a cache tag invalidation flag based on the invalidation tag 26 in this state, the probability of making a spurious determination is about one in seven hundred thousand as also indicated at line 62.

When a third invalidation command is received before the invalidation tag 26 is reset to the clear state, the bit of field 40 is set to binary three (11) and fourteen (14) least significant bits, respectively of the forty-two (42) bits of the first two invalidation addresses of the respective received commands and thirteen (13) least significant bits of the forty-two (42) bits of the third invalidation address of the respective received commands are stored in field 42 as indicated at line 63. If the cache 14 proceeds to make a determination of whether to set a cache tag invalidation flag based on the invalidation tag 26 in this state, the probability of making a spurious determination is about one in four thousand as also indicated at line 63.

When a fourth invalidation command is received before the invalidation tag 26 is reset to the clear state, the bit of field 40 is set to binary zero (00) and the forty-two (42) bit addresses of the four commands are incorporated into a hash array and in field 42 as a forty-one (41) bit hash array as indicated at line 64. If the cache 14 proceeds to make a determination of whether to set a cache tag invalidation flag based on the invalidation tag 26 in this state, the probability of making a spurious determination is about one in ten since a hash array of the four addresses is provided as also indicated at line 64.

Further invalidation commands may be received before the invalidation tag 26 is reset to the clear state in a similar manner to the FIG. 5 example, but the probability of spurious invalidations will continue to increase. In order to avoid to high of a probability of spurious invalidations, the cache 14 may be configured to proceeds to make a determination of whether to set a cache tag invalidation flag based on an invalidation tag 26 whenever in the tag reaches a state of containing information of a predetermined number of commands. After the information stored in an invalidation tag 26 to make such determination, the invalidation tag will normally be reset to the clear state.

In a MOESI embodiment, the invalidation tag 26 may include a bit 44 that signifies that all exclusive (E-state) blocks within the set are still clean. In traditional MOESI protocols, exclusive clean cache blocks don't transition to M state until they are written and become dirty. With the addition of single all exclusive bit 44 in the invalidation tag 26, the cache 14 can set the bit 44 to indicate to the appropriate invalidation tag 26 whether an E line transitioned to M. In a set associative cache 14, this bit will suffer from false positives, but when clear, invalidations for exclusive copies can be responded to without accessing the cache array. Data for such invalidation requests may potentially be supplied by lower level caches or main memory.

Invalidation tags in accordance with the above teachings may be advantageously employed with respect to any type of cache. Embodiments readily include cases where the cache is a read-only cache and the invalidation commands are the result of the same processor modifying data. For example, such cases include an instruction cache being invalidated as a result of stores by the processor as well as the case where the data cache is partitioned into an always-clean read-only cache and a separate parallel write-cache.

It should be understood that the methods described herein may be implemented in a CPU, a GPU, an APU, or any other processor that uses working memory and that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A data processing device comprising:
a cache associated with a processing engine;
the cache configured to store a plurality of cache entries;
each cache entry including a cache line configured to store data and a corresponding cache tag configured to store address information associated with data stored in the cache line where the address information includes an invalidation flag with respect to each address stored in the cache tag;
    each cache tag associated with an invalidation tag configured to store information related to invalidation commands of addresses stored in the cache tag, wherein the invalidation tag includes invalidation address information in the form of a hash array on a condition that at least a predetermined number of invalidation commands, greater than 1, have been received; and
    the cache configured to set invalidation flags of cache tags based upon information stored in respective invalidation tags.

2. The data processing device of claim 1 wherein at least one invalidation tag is associated with the cache tag of a plurality of cache entries.

3. The data processing device of claim 1 wherein the cache is configured as a read only cache and the invalidation tags are configured to receive invalidation commands from the processing engine.

4. The data processing device of claim 1 wherein the invalidation tags are configured to receive invalidation commands from at least one other processing engine.

5. The data processing device of claim 1 wherein the invalidation tags include a clear state indicating the absence of received invalidation commands and the cache is configured to determine whether to set invalidation flags to an invalid state with respect to addresses stored in a cache tag upon a condition that the associated invalidation tag is not in the clear state.

6. The data processing device of claim 5 wherein the cache is configured to determine whether to set invalidation flags to an invalid state with respect to addresses stored in a cache tag upon a further condition that a look up command with respect to the cache tag is received.

7. The data processing device of claim 5 wherein the cache is configured to set an invalidation tag to the clear state following a cache determination whether to set invalidation flags to an invalid state with respect to addresses stored in the cache tag associated with the invalidation tag.

8. The data processing device of claim 5 wherein the invalidation tags include a field for storing information related to a number of invalidation commands received and a field for storing the invalidation address information corresponding to received commands.

9. The data processing device of claim 8 wherein the invalidation tags include a field for storing information related to a cache coherence state of the addresses stored in the cache tags with which the invalidation tags are associated.

10. The data processing device of claim 1 wherein:
the data processing device includes a plurality of processing engines, each associated with a respective cache;
each cache configured to store a plurality of cache entries;
each cache entry including a cache line configured to store data and a cache tag configured to store address information associated with data stored in the cache line where the address information includes an invalidation flag with respect to each stored address;
each cache tag associated with an invalidation tag configured to store information related to invalidation commands of addresses stored in the cache tag; and
each cache configured to set invalidation flags of cache tags based upon information stored in respective invalidation tags.

11. A method of data processing comprising:
providing a cache associated with a processing engine;
    storing a plurality of cache entries such that each cache entry includes a cache line to which data is stored and a corresponding cache tag to which address information associated with data stored in the cache line is stored where the address information includes an invalidation flag with respect to each address stored in the cache tag;
    storing information related to invalidation commands of addresses stored in a cache tag in an invalidation tag associated with the cache tag, wherein the invalidation tag includes invalidation address information in the form of a hash array on a condition that at least a predetermined number of invalidation commands, greater than 1, have been received; and setting invalidation flags of cache tags based upon information stored in respective invalidation tags.

12. The data processing method of claim 11 wherein a respective invalidation tag is associated with each the cache entry and the storing information related to invalidation commands of addresses stored in the cache entry's cache tag is in the cache entry's respective invalidation tag.

13. The data processing method of claim 11 wherein at least one invalidation tag is associated with the cache tag of a plurality of cache entries such that invalidation commands of addresses for any of the cache tags of the plurality of cache entries is stored in such invalidation tag.

14. The data processing method of claim 11 further comprising receiving invalidation commands from at least one other processing engine by the invalidation tags.

15. The data processing method of claim 11 wherein the invalidation tags include a clear state indicating the absence of received invalidation commands further comprising determining whether to set invalidation flags to an invalid state with respect to addresses stored in a cache tag upon a condition that the associated invalidation tag is not in the clear state.

16. The data processing method of claim 15 wherein the determining whether to set invalidation flags to an invalid state with respect to addresses stored in a cache tag is upon a further condition that a look up command with respect to the cache tag is received.

17. The data processing method of claim 15 further comprising setting an invalidation tag to the clear state following a cache determination whether to set invalidation flags to an invalid state with respect to addresses stored in the cache tag associated with the invalidation tag.

18. The data processing method of claim 15 further comprising storing information related invalidation commands in an invalidation tag including storing information related to a number of invalidation commands received in a first field of the invalidation tag and storing in a second field of the invalidation tag the invalidation address information corresponding to received commands.

19. The data processing method of claim 18 further comprising storing in a third field of the invalidation tag information related to a cache coherence state of the addresses stored in the cache tags with which the invalidation tags are associated.

20. The data processing method of claim 12 further comprising:
- providing a plurality of processing engines, each associated with a respective cache;
- storing a plurality of cache entries in each respective cache such that each cache entry includes a cache line to which data is stored and a corresponding cache tag to which address information associated with data stored in the cache line is stored where the address information includes an invalidation flag with respect to each address stored in the cache tag;
- storing information related to invalidation commands of addresses stored in a cache tag in an invalidation tag associated with the cache tag; and
- setting invalidation flags of cache tags based upon information stored in respective invalidation tags.

21. A non-transitory computer-readable storage medium storing a set of instructions for execution by a general purpose computer to facilitate manufacture of an integrated circuit that includes:
- a processing component having:
  - a cache associated with a processing engine; the cache configured to store a plurality of cache entries; each cache entry including a cache line configured to store data and a corresponding cache tag configured to store address information associated with data stored in the cache line where the address information includes an invalidation flag with respect to each address stored in the cache tag;
  - each cache tag associated with an invalidation tag configured to store information related to invalidation commands of addresses stored in the cache tag, wherein the invalidation tag includes invalidation address information in the form of a hash array on a condition that at least a predetermined number of invalidation commands, greater than 1, have been received; and
  - the cache configured to set invalidation flags of cache tags based upon information stored in respective invalidation tags.

22. The non-transitory computer-readable storage medium of claim 21, to facilitate manufacture of an integrated circuit that includes:
- a plurality of processing components each having:
  - a processing engine associated with a respective cache;
  - each cache configured to store a plurality of cache entries;
  - each cache entry including a cache line configured to store data and a cache tag configured to store address information associated with data stored in the cache line portion where the address information includes an invalidation flag with respect to each stored address;
  - each cache tag associated with an invalidation tag configured to store information related to invalidation commands of addresses stored in the cache tag; and
  - each cache configured to set invalidation flags of cache tags based upon information stored in respective invalidation tags.

23. The non-transitory computer-readable storage medium of claim 21, wherein the instructions are hardware description language (HDL) instructions used for the manufacture of a device.

* * * * *